US011703009B2

(12) United States Patent
Tian et al.

(10) Patent No.: US 11,703,009 B2
(45) Date of Patent: Jul. 18, 2023

(54) METHOD AND SYSTEM FOR FUEL FILTER MONITORING

(71) Applicant: Caterpillar Inc., Peoria, IL (US)

(72) Inventors: Ye Tian, Bloomington, IL (US); Sravan K. Karri, Dunlap, IL (US); Michael T. McKinley, Washington, IL (US); Brenton W. Bush, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/663,342

(22) Filed: May 13, 2022

(65) Prior Publication Data
US 2022/0275767 A1  Sep. 1, 2022

Related U.S. Application Data

(63) Continuation of application No. 17/165,461, filed on Feb. 2, 2021, now Pat. No. 11,339,737.

(51) Int. Cl.
*F02D 41/22* (2006.01)
*F02M 37/40* (2019.01)
(Continued)

(52) U.S. Cl.
CPC ........... *F02D 41/22* (2013.01); *B01D 35/005* (2013.01); *B01D 35/143* (2013.01);
(Continued)

(58) Field of Classification Search
CPC ... F02D 41/22; F02D 2014/021; F02M 37/40; B01D 35/005; B01D 35/143; B01D 37/046; B01D 37/048; B60Q 9/00
(Continued)

(56) References Cited

U.S. PATENT DOCUMENTS 6,672,147 B1   1/2004  Mazet
9,061,224 B2   6/2015  Verdegan et al.
(Continued)

FOREIGN PATENT DOCUMENTS

CN   204419425 U  *  6/2015
CN   110953103 A      4/2020
(Continued)

OTHER PUBLICATIONS

CN210135024U (Ma et al.) (Mar. 3, 2020) (Machine Translation) (Year: 2020).*
(Continued)

*Primary Examiner* — Mahmoud Gimie

(57) ABSTRACT

A fuel filter monitoring method includes receiving pressure signals that are indicative of a pressure drop across at least one fuel filter of a fuel supply system configured to supply fuel to at least one fuel injector of an internal combustion engine and receiving a condition signal indicative of a condition of a fuel supply system, the condition signal being generated by one or more of a geographic location sensor, an altitude sensor, and/or a fuel temperature sensor. The method includes estimating a remaining life of at least one fuel filter of the fuel supply system based on the pressure signal and the condition signal and outputting a notification indicative of the estimated remaining life.

20 Claims, 4 Drawing Sheets

(51) Int. Cl.
*B01D 35/143* (2006.01)
*B01D 37/04* (2006.01)
*B01D 35/00* (2006.01)
*B60Q 9/00* (2006.01)
*F02D 41/02* (2006.01)

(52) U.S. Cl.
CPC ......... *B01D 37/046* (2013.01); *B01D 37/048* (2013.01); *B60Q 9/00* (2013.01); *F02D 41/021* (2013.01); *F02M 37/40* (2019.01); *B01D 2201/52* (2013.01); *B01D 2201/54* (2013.01); *F02D 2041/224* (2013.01); *F02D 2041/228* (2013.01); *F02D 2200/0606* (2013.01); *F02D 2200/0611* (2013.01); *F02D 2200/70* (2013.01)

(58) Field of Classification Search
USPC ......................................................... 701/102
See application file for complete search history.

(56) References Cited

U.S. PATENT DOCUMENTS

| | | | |
|---|---|---|---|
| 10,184,415 B2 | 1/2019 | Shimpi et al. | |
| 10,634,022 B2 | 1/2020 | Carpenter et al. | |
| 10,546,435 B2 | 4/2020 | Verdegan et al. | |
| 2003/0226809 A1 | 12/2003 | Zagone et al. | |
| 2009/0027214 A1* | 1/2009 | Elwood | F02D 33/003 |
| | | | 340/607 |
| 2011/0054811 A1 | 3/2011 | Contini | |
| 2015/0025773 A1* | 1/2015 | Kashiyama | F02M 37/40 |
| | | | 701/102 |
| 2015/0025776 A1 | 1/2015 | Kashiyama | |
| 2016/0116392 A1 | 4/2016 | Carpenter et al. | |
| 2016/0208726 A1 | 7/2016 | Tanaka et al. | |
| 2017/0321618 A1 | 11/2017 | Jausel | |
| 2019/0153971 A1 | 5/2019 | Prabhala et al. | |
| 2020/0300148 A1 | 9/2020 | Beatham et al. | |

FOREIGN PATENT DOCUMENTS

| | | | | |
|---|---|---|---|---|
| DE | 102014109732 A1 | * | 2/2015 | ............ F02D 41/22 |
| JP | 2008057331 A | | 3/2008 | |
| JP | 2010106682 A | * | 5/2010 | |
| JP | 6794790 B2 | | 12/2020 | |
| KR | 100875700 B1 | | 12/2008 | |
| SE | 1450663 A1 | * | 12/2015 | |
| WO | 2015032765 A1 | | 3/2015 | |
| WO | WO-2015032765 A1 | * | 3/2015 | ........... B01D 35/005 |
| WO | WO-2021155255 A1 | * | 8/2021 | |

OTHER PUBLICATIONS

JP2010106682 (Moriyama et al.) (May 13, 2010) (Machine Translation) (Year: 2010).*
Written Opinion and International Search Report for Int'l. Patent Appln. No. PCT/US2022/013091, dated May 11, 2022 (12 pgs).

* cited by examiner

METHOD AND SYSTEM FOR FUEL FILTER MONITORING

CROSS-REFERENCE TO RELATED APPLICATION(S)

This patent application is a continuation of and claims the benefit of priority to U.S. Nonprovisional patent application Ser. No. 17/165,461, filed on Feb. 2, 2021, the entirety of which is incorporated herein by reference.

TECHNICAL FIELD

The present disclosure relates generally to systems for internal combustion engines, and more particularly, to methods and systems for monitoring one or more fuel filters of an internal combustion engine system.

BACKGROUND

Fuel filters are important components of internal combustion engine fuel systems, removing particulate matter or other contaminants. Fuel filters accumulate material over time, gradually becoming more resistant to flow and eventually requiring replacement. Traditionally, fuel filters are replaced after a predetermined service interval, such as a certain operating time of the engine. These service intervals are set with the goal of preventing excessive clogging of the fuel filter. Some systems determine a replacement time for a fuel filter based on look-up tables or maps, according to a relationship between a pressure drop introduced by the fuel filter and an amount of material accumulated within the filter. Predetermined service intervals and map-based approaches may be useful for providing rough estimates, they may be unable to accurately predict fuel filter health, particularly under changing conditions.

A liquid filtration system is disclosed in U.S. Pat. No. 10,184,415 (the '415 patent) to Shimpi et al. The system described in the '415 patent includes pressure sensors that are used to estimate the condition of a filter system. The pressure sensors in the '415 patent provide restriction information of the filter system. While the system described in the '415 may be useful in some circumstances, the use of restriction information based on pressure sensors may be insufficient to accurately estimate an amount of material accumulated in the filter, or an amount of useful life remaining in the filter.

The disclosed method and system may solve one or more of the problems set forth above and/or other problems in the art. The scope of the current disclosure, however, is defined by the attached claims, and not by the ability to solve any specific problem.

SUMMARY

In one aspect, a fuel filter monitoring method may include receiving pressure signals that are indicative of a pressure drop across at least one fuel filter of a fuel supply system configured to supply fuel to at least one fuel injector of an internal combustion engine and receiving a condition signal indicative of a condition of a fuel supply system, the condition signal being generated by one or more of a geographic location sensor, an altitude sensor, and/or a fuel temperature sensor. The method may include estimating a remaining life of at least one fuel filter of the fuel supply system based on the pressure signal and the condition signal and outputting a notification indicative of the estimated remaining life.

In another aspect, a fuel filter monitoring method for a fuel supply system including a plurality of fuel injectors, at least one fuel filter upstream of the one or more of the fuel injectors, and a sensor system configured to detect at least one of a location, a barometric pressure, or a fuel temperature associated with the fuel supply system may include receiving a signal indicative of at least one of the location, the barometric pressure, or the fuel temperature. The method may include determining a remaining life of the fuel supply system based on a pressure drop across the at least one fuel filter and the received signal and outputting a notification indicative of the remaining life of the fuel supply system.

In yet another aspect, a fuel filter monitoring system may include an internal combustion engine that receives fuel injected by a plurality of fuel injectors and a fuel supply system including at least one fuel filter connected between one or more of the fuel injectors and a fuel source for supplying fuel to the internal combustion engine. The system may include a sensor system configured to detect a pressure change across the at least one fuel filter and a controller. The controller may be configured to estimate a remaining life associated with the fuel supply system based on the pressure change and output a notification indicative of a performance of the at least one fuel filter based on the estimated remaining life.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Both the foregoing general description and the following detailed description are exemplary and explanatory only and are not restrictive of the features, as claimed. As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus. Moreover, in this disclosure, relative terms, such as, for example, "about," "substantially," "generally," and "approximately" are used to indicate a possible variation of ±10% in the stated value.

Figure 1:
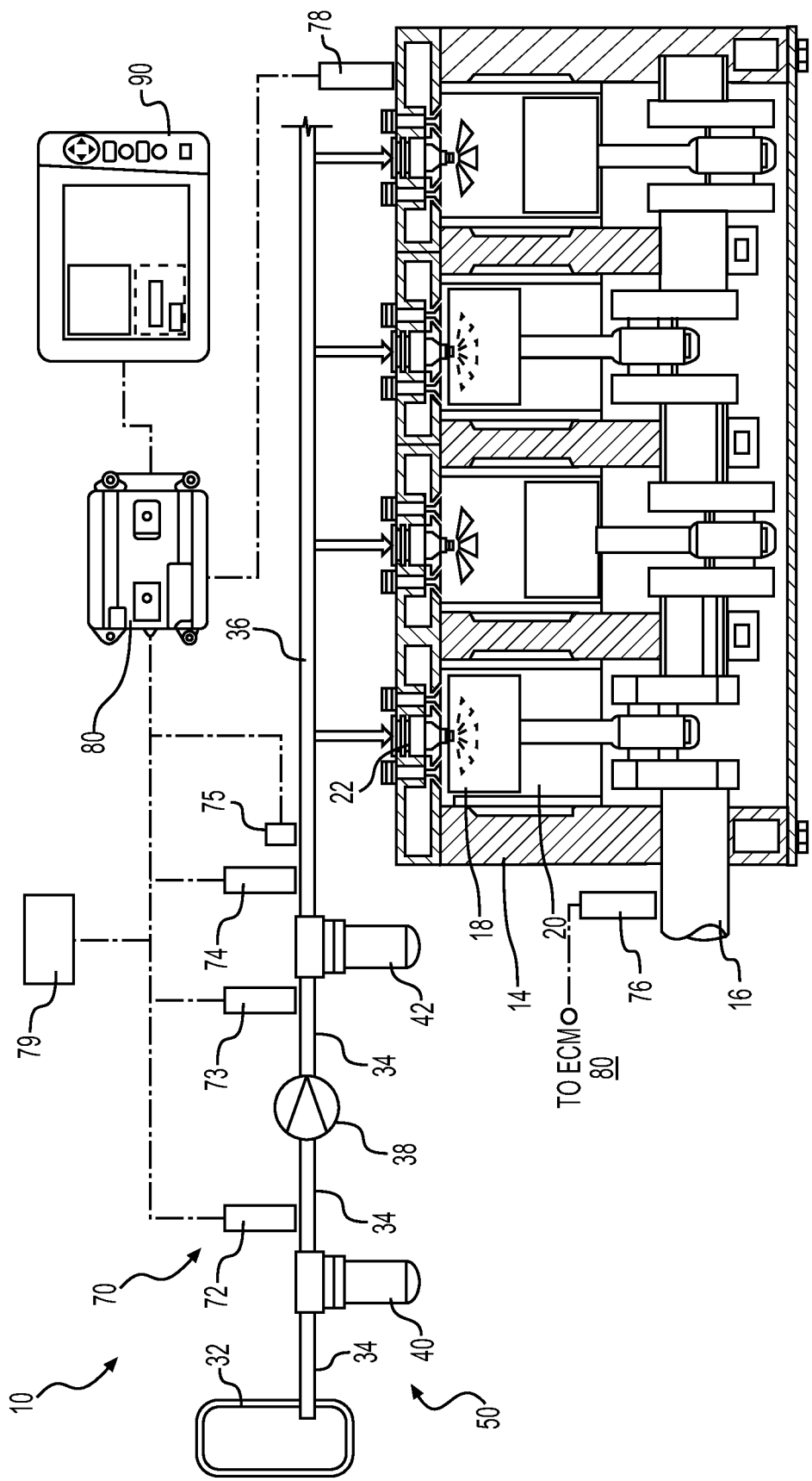
FIG. 1 is a partially schematic cross-sectional view of a system for monitoring one or more fuel filters, according to aspects of the present disclosure.

FIG. 1 illustrates an exemplary engine control and fuel filter monitoring system 10 according to an aspect of the present disclosure. Fuel filter monitoring system 10 may include an internal combustion engine 14, a fuel system 50, and a sensor system 70. Monitoring system 10 may include a control system having one or more controllers, such as electronic control module (ECM) 80. Fuel filter monitoring system 10 may also include one or more devices for displaying a prompt, warning, or other notification to one or more users, such as a notification device 90.

Internal combustion engine 14 may include pistons 18, a respective plurality of cylinders 20, and one or more crankshafts 16. Fuel injectors 22 may be secured to engine 14 to inject fuel (e.g., liquid fuel, such as diesel fuel, and/or gaseous fuel) toward a respective combustion chamber of cylinders 20. While four cylinders 20 are shown in FIG. 1, engine 14 may include any number of cylinders 20, such as six, eight, ten, twelve, sixteen, twenty or more. For example, engine 14 may be an inline six-cylinder diesel engine, or may have any standard form.

Fuel system 50 of system 10 may supply fuel to injectors 22. In the exemplary configuration illustrated in FIG. 1, fuel system 50 may include a fuel source 32, such as a fuel tank, fuel lines 34, and a pressurized fuel rail or common rail 36. Fuel system 50 may also include a plurality of fuel filters, including a first fuel filter 40 and a second fuel filter 42, connected to fuel source 32 by a plurality of fuel passages 34. While fuel filters 40 and 42 are each illustrated as an individual fuel filter in FIG. 1, fuel filters 40 and 42 may be an assembly of fuel filters, including a plurality of fuel filters that are fluidly connected to each other in parallel or in series. In some aspects, first fuel filter 40 may include one or more primary fuel filters, while fuel filters 42 may include one or more secondary fuel filters for removing finer particulate matter as compared to first fuel filters 40. If desired, fuel system 50 may include one or more tertiary fuel filters.

A fuel pump 38 may be fluidly connected to fuel filters 40 and 42. In an exemplary configuration, pump 38 may be connected between first fuel filter 40 and second fuel filter 42. A downstream passage or common fuel rail 36 may be connected downstream of first and second fuel filters 42 to supply pressurized fuel to injectors 22. While first fuel filter 40 is connected upstream of pump 38 in the exemplary configuration shown in FIG. 1, fuel pump 38 may be connected upstream of both first and second fuel filters 40 and 42. One or more additional pumps 38 may be connected downstream of second fuel filter 42 for increasing a pressure supplied to injectors 22.

Sensor system 70 may include a plurality of sensors to detect the condition of different components of system 10, for example, a plurality of sensors for detecting conditions of fuel system 50. In particular, sensor system 70 may include sensors useful for monitoring a remaining life of a fuel filter, such as sensors configured to detect altitude and/or geographic location, atmospheric pressure, fuel pressure associated with first fuel filter 40, fuel pressure at an inlet of second fuel filter 42, fuel pressure at an outlet pressure of second fuel filter 42, and fuel temperature. A pressure sensor 72 may be configured to measure a pressure of fuel associated with first filter 40. This pressure may be measured at an outlet of first fuel filter 40 upstream of pump 38. A pressure sensor 73 may be configured to measure a pressure of fuel provided to an inlet of second fuel filter 42 at a position downstream of pump 38. A pressure sensor 74 may be configured to measure a pressure of fuel as it exits an outlet of second fuel filter 42. A fuel temperature sensor 75 may be configured to detect a temperature of fuel supplied via fuel system 50. Sensor system 70 may also include a pressure sensor (not shown) configured to detect pressure of fuel upstream of first fuel filter 40 (e.g., pressure within a tank of fuel source 32), to facilitate detection of a pressure drop across first fuel filter 40 in conjunction with sensor 72.

Sensor system 70 may include one or more other sensors configured to detect conditions of engine 14. For example, sensor system 70 may include one or more engine speed sensors 76, altitude sensors 78, and location sensors 79. System 70 may also include airflow sensors, inlet air temperature sensors, exhaust temperature sensors, and engine temperature sensors, among others. Engine speed sensor 76 may be configured to detect a rotation speed and/or rotational position of crankshaft 16. Engine speed sensor 76 may include camshaft speed and/or position sensors, instead of or in addition to a crankshaft sensor. Altitude sensor 78 may be configured to output a signal indicative of an altitude of engine 14. Altitude sensor 78 may include a barometric pressure sensor, for example. A location sensor 79 (e.g., a global positioning system antenna and/or system) may be configured to determine a location of engine 14. In one aspect, sensors 78 and/or 79 may be configured to provide a signal to ECM 80 indicative of an altitude of engine 14, based on a detected barometric pressure measured with sensor 78 or based on a geographic location of engine 14 measured with sensor 79. Sensors of sensor system 70 may have any standard or conventional form.

ECM 80 may include a single microprocessor or multiple microprocessors configured to receive sensed inputs and generate commands to control the operation of components of engine 14, including fuel injectors 22, pump 38 and/or other fuel pumps, fuel recirculation systems, an intake throttle valve, exhaust recirculation valve(s), and/or others. ECM 80 may be configured to generate outputs for one or more systems including a display (e.g., notification device 90). These outputs may be indicative of a status of one or more components of system 10, including a status of fuel supply system 50 and, in particular, one or more fuel filters 40, 42. ECM 80 may be configured to monitor a remaining useful life of components of fuel supply system 50, including individually monitoring a plurality of fuel filters 40, 42.

ECM 80 may include a memory, a secondary storage device, processor(s), such as central processing unit(s), networking interfaces, or any other means for accomplishing a task consistent with the present disclosure. The memory or secondary storage device associated with ECM 80 may store data and software to allow ECM 80 to perform its functions, including the functions described below with respect to method 300 (FIG. 3) and the analysis described with respect to FIG. 4. In particular, data and software in memory or secondary storage device(s) may allow ECM 80 to perform the modeling, monitoring, signal analysis, engine control (e.g., derating), and notification operations described herein. Numerous commercially available microprocessors can be configured to perform the functions of ECM 80. Various other known circuits may be associated with ECM 80, including signal-conditioning circuitry, communication circuitry, display control circuitry, and other appropriate circuitry.

Notification device 90 may include one or more devices or systems associated with internal combustion engine 14. For example, notification device 90 may include a display or notification area within a cabin of a machine that is driven by engine 14. Notification device 90 may correspond to a screen of a device in communication with ECM 80, such as a diagnostic device (e.g., an on-board diagnostic of engine 14 and/or a machine in which engine 14 is installed), a computing system, and/or a remote monitoring system. Notification device 90 may be in communication with ECM 80 over a wired or wireless network, such as the Internet, a Local Area Network, WiFi, Bluetooth, or any combination of suitable networking arrangements and protocols. Whether notification device 90 is connected to engine 14, integrated into a machine with ECM 80, or incorporated in one or more remote systems, notification device 90 may include a display or screen configured to present one or more of the notifications described below, including an initial warning when remaining useful life of a fuel filter 40, 42 is below a first predetermined threshold, a second warning when remaining useful life of fuel filter 40, 42 is below a second predetermined threshold, and/or a third warning or de-rating notification when a remaining useful life of fuel filter 40, 42 is exceeded. Notification device 90 may also present a notification indicative of one or more characteristics of fuel filters 40, 42 based on an estimated remaining useful life of these fuel filters 40, 42, as described below.

Figure 2:
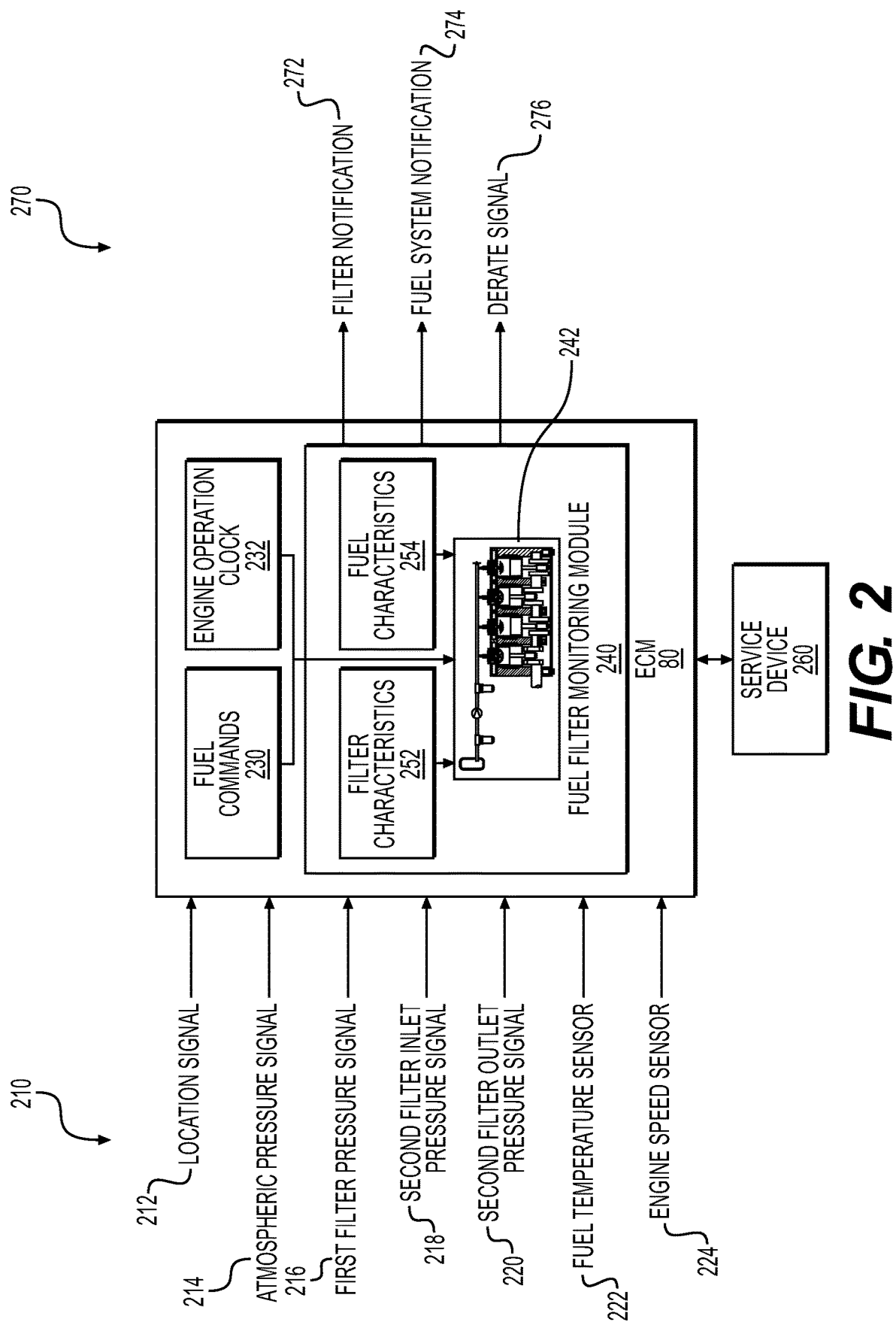
FIG. 2 is a block diagram of an exemplary engine control module of the fuel filter monitoring system of FIG. 1.

FIG. 2 is a block diagram illustrating an exemplary configuration of ECM 80 useful for monitoring an amount of remaining useful life for one or more components of fuel system 50, such as a plurality of fuel filters 40, 42. ECM 80 may, if desired, monitor the remaining useful life of fuel supply system 50 as a whole, based on the remaining life of fuel filters 40 and/or 42. ECM 80 may also be configured to operate engine 14 based on the remaining life of one or more of fuel filters 40, 42 and/or system 50. For example, ECM 80 may derate engine 14 when the remaining life of fuel filters 40, 42 declines beyond a predetermined threshold. Additionally, ECM 80 may be configured to identify fuel quality and/or a type of fuel filter, based on the remaining useful life of one or more fuel filters 40, 42.

ECM 80 may receive a plurality of inputs 210 from respective sensors of sensor system 70. ECM 80 may also receive data from a service device 260 as one or more additional inputs. Information input from service device 260 may be useful for providing initial settings (e.g., filter and/or fuel characteristics 252, 254) and/or for resetting monitoring module 240 when fuel filters 40, 42 are replaced.

Information from inputs 210 may include data supplied via a location signal 212 from location sensor 79. Location signal 212 may be indicative of a geographic location, as identified with a global positioning system receiver or sensor 79. Atmospheric pressure signal 214 may be indicative of a barometric pressure, and may be generated by atmospheric pressure sensor 78. Signal 212 and 214 may be processed by ECM 80 to facilitate the determination of an elevation of system 10. This elevation may be useful for adjusting a remaining life calculation based on a current elevation of system 10 and engine 14.

First filter pressure signal 216 may be indicative of a pressure associated with first fuel filter 40. For example, pressure sensor 72 may output pressure signal 216 based on an amount of fuel pressure detected at an outlet of first filter 40. If desired, pressure signal 216 may also include a signal indicative of a pressure of fuel upstream of first filter 40. Second fuel filter inlet pressure signal 218 may be generated by pressure sensor 73 to indicate a pressure of fuel entering an inlet of second fuel filter 42. Second filter outlet pressure signal 220 may be generated by pressure sensor 74 to indicate a pressure of fuel at an outlet of second fuel filter 42. A fuel temperature signal 222 generated by temperature sensor 75 may indicate a temperature of fuel within fuel supply system 50. Signal 222 may be indicative of a temperature of fuel within common rail 36, fuel contained in a tank of fuel source 32, or fuel at other suitable locations of fuel supply system 50. An engine speed signal 224 may be generated by speed sensor 76 and may be indicative of an amount of load placed on engine 14, a rate of fuel consumption by engine 14, or other conditions of engine 14. These conditions may also be monitored based on other signals, such as signals indicative of a position of an intake air throttle valve, a rate of flow of intake air, etc.

ECM 80 may be programmed with a fuel filter monitoring module 240 that processes inputs 210 and enables ECM 80 to monitor a status of fuel filters 40, 42. ECM 80 may also calculate fuel commands 230 and include an engine operation clock 232. Fuel commands 230 may include commands issued to fuel injectors 22, or other commands indicative of an amount of fuel burned by engine 14. Fuel commands 230 and engine speed sensor signal 224 may also be indicative of a load placed on engine 14. Engine operation clock 232 may be a timer that allows ECM 80 to measure an operating time of engine 14. In particular, engine operation clock 232 may allow ECM 80 to monitor an amount of time that has elapsed following a start-up of engine 14 from a stopped state, to facilitate the measurement of an amount of useful life that is expended during a particular operation of engine 14. Clock 232 may allow module 240 to independently measure a cumulative operating time of each fuel filter 40, 42. Engine operation clock 232 may allow fuel filter monitoring module 240 to update a remaining life of fuel filters 40, 42, and provide updated notifications (e.g., notifications 272, 274), after a predetermined amount of time (e.g., at regular intervals).

To facilitate monitoring of fuel filters 40, 42, module 240 may be provided with an engine model 242, filter characteristics 252, and fuel characteristics 254. Model 242 may be a physics-based model representative of engine 14 and fuel supply system 50. This physics-based model 242 may be programmed with characteristics of components of engine 14 and system 50 stored in filter characteristics 252 and fuel characteristics 254. Physics-based model 242 may include a plurality of relationships, stored as formulas, that characterize a plurality of physical relationships of engine 14 and fuel system 50.

Filter characteristics 252 may include characteristics of fuel filters 40, 42, such as fuel filter efficiency, fuel filter media area, expected fuel filter life, maximum pressure drop across each fuel filter (e.g., a maximum allowable pressure drop indicative of a clogged fuel filter), or others. Fuel characteristics 254 may include fuel quality (e.g., fuel cleanliness, which may be characterized according to the ISO 4406 standard), fuel density, an amount of fuel recirculation, or others. These formulas may involve, for example, information from sensor system 70, filter characteristics 252, and fuel characteristics 254. In particular, these formulas may allow model 242 to estimate a remaining useful life of fuel filters 40, 42 based on a condition signal generated by one or more of a geographic location sensor (e.g., sensor 79), altitude sensor (e.g., sensor 78 and/or 79), and/or fuel temperature sensor 75.

Information stored in filter characteristics 252 and fuel characteristics 254 may be initially programmed into a memory of ECM 80 along with model 242 of monitoring module 240. For example, characteristics 252 and 254 may be input or modified by service device 260, which is part of the engine control system 10 (e.g., associated with notification device 90), or a plug-in and removable device that can be connected to engine control system 10. Service device 260 may receive user input corresponding to characteristics of fuel filters 40, 42, installed in engine 14. In particular, service device 260 may be configured to input fuel particle size, fuel density, and/or a value corresponding to an amount of flow restriction caused by fuel filters 40, 42. Additionally, information stored in characteristics 252 and/or 254 may be manually entered. For example, information in filter characteristics 252 may be entered by inputting a model number or other identifier indicative of a type of fuel filter 40, 42.

Model 242 may include, for example, a plurality of relationships that reflect the actual decrease in remaining life of filters 40, 42 as function(s) of engine conditions (e.g., load) received and/or calculated via fuel commands 230. These function(s) may also involve sensor inputs, filter efficiency or other data from filter characteristics 252, fuel cleanliness, a pressure drop across each fuel filter 40, 42 or of each fuel assembly including fuel filters 40, 42, a maximum pressure drop of fuel filters 40, 42, and others. Model 242 may be configured to determine remaining life of fuel filters 40, 42 by taking into account the effect of fuel recirculation (e.g., a recirculation ratio representative of an amount of fuel that recirculates from a location downstream of fuel filter 40 to a position upstream of fuel filter 40), changes in altitude, and/or changes in fuel cleanliness.

ECM 80 may be configured to modify information stored in fuel characteristics 254 based on information output from model 242 during the operation of engine 14. For example, ECM 80 may be configured to modify fuel characteristics 254 based on changing conditions detected by sensor system 70 (e.g., due to changes in the fuel provided to system 50 and engine 14). Changing fuel conditions detected by sensor system 70 may include, for example, burning rate of fuel, load on engine 14, fuel temperature, and/or an environmental adjustment, such as an adjustment based on detected altitude. Changes in fuel of system 50 may include changes in fuel quality (e.g., fuel cleanliness). ECM 80 may be configured to monitor and periodically modify a fuel cleanliness value indicative of the cleanliness of fuel present in fuel source 32 and/or other components of fuel supply system 50. The fuel cleanliness value may be indicative of a quantity of particulate matter present within the fuel. ECM 80 may utilize the output of model 242 to monitor changes in fuel cleanliness over time.

ECM 80 may generate one or more outputs 270 that are received by engine 14, notification device 90, service device 260, and/or other systems associated with system 10. Outputs 270 may include a filter notification 272 indicative of remaining life of filters 40, 42 and/or a remaining life of fuel system 50, a fuel system notification 274 which may be indicative of a quality of fuel provided to fuel source 32, and a derate signal 276 configured to limit output of engine 14 and provide a notification to an operator of engine 14 of a state of filters 40, 42.

INDUSTRIAL APPLICABILITY

Fuel filter monitoring system 10 may be used in conjunction with any appropriate machine, vehicle, or other device or system that includes an internal combustion engine having one or more fuel filters. Monitoring system 10 may be applied, for example, to internal combustion engines in which fuel is filtered prior to injection. Monitoring system 10 may be used in conjunction with various types of engines 14 and fuel systems 50, such as engines with common rail diesel fuel injection, unit diesel fuel injection, dual fuel injection (e.g., diesel and gaseous fuel), or gaseous fuel injection. Monitoring system 10 may also be applied in a variety of machines or vehicles, including machines applicable for earthmoving, paving, power generation, mining, marine applications, transportation, or others.

In engine systems with at least one fuel filter, it may be desirable to monitor a remaining life, also referred to as a remaining useful life, of the filters. In particular, it may be desirable to monitor the remaining useful life of one or more fuel filters with a physics-based approach that has improved prediction accuracy as compared to map-based or operating hours-based approaches. The use of monitoring methods and systems that incorporate physics-based analytical approaches may improve the accuracy of remaining life estimations, especially when conditions of the system and engine change over time.

Figure 3:
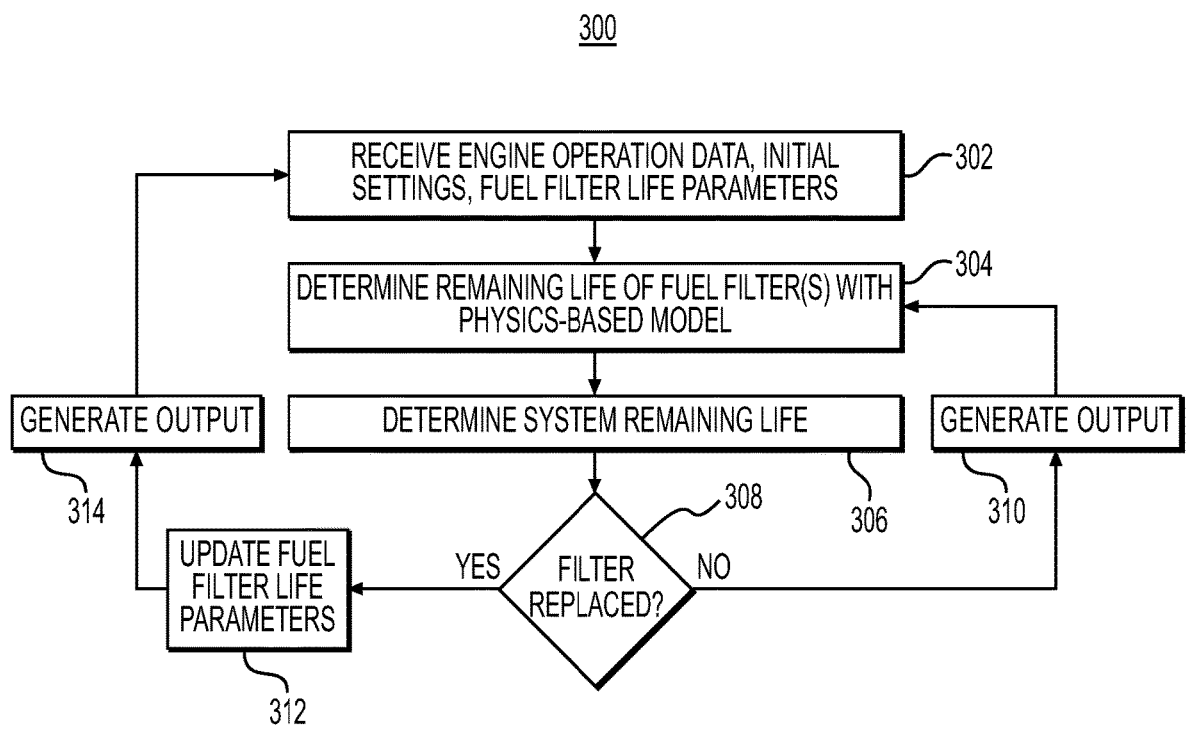
FIG. 3 is a flowchart of a method for monitoring a remaining life of a fuel system, according to aspects of the present disclosure.

FIG. 3 is a flowchart illustrating an exemplary method 300 for monitoring a remaining life of fuel system 50. Method 300 may be performed to monitor the state of fuel system 50 in its entirety, and/or to individually monitor one or more fuel filters 40, 42, of fuel system 50. Method 300 may be performed continuously or intermittently during operation of system 10 and engine 14. During step 302, ECM 80 may receive engine operation data, initial settings, and fuel filter life parameters. Step 302 may be performed repeatedly (e.g., continuously or at intervals) during method 300.

Engine operation data received by ECM 80 during step 302 may include data indicative of a current state of engine 14 and systems associated with engine 14. For example, engine operation data may include information from sensor system 70, including signals 212-224. Engine operation data may also include one or more values received by performing a calculation with ECM 80, including values calculated based on sensors of sensor system 70. In particular, a burning rate of fuel and/or fuel flow rate through filters 40, 42 may be calculated during step 302.

Initial settings may be received during a first operation of method 300 and may be accessed as necessary during performance of method 300. Initial settings may include, for example, a maximum expected life of each filter 40, 42 installed in system 50. This remaining expected life may be based on an expected operation time of a particular filter, as measured in engine hours, or a related unit of measurement. If desired, remaining life may be calculated or displayed as a percentage, with an initial value of 100% being equivalent to this expected operation time. An initial value of fuel quality (e.g., fuel cleanliness) may also be set with fuel filtering monitoring module 240 of ECM 80. This initial fuel quality value may be determined based on a predetermined reference value that is used each time a filter 40, 42 is replaced, or based on the cleanliness value measured during previous operations.

Fuel filter life parameters received during step 302 may include data that are configured to be updated by fuel filter monitoring module 240 to facilitate self-learning during method 300. Exemplary fuel filter life parameters may include values that affect a rate at which the remaining life of filters 40, 42 decreases. For example, fuel filter life parameters may include fuel quality (stored in fuel characteristics 254), which contributes to increased rates of deterioration of filters 40, 42 as fuel quality decreases. Fuel filter life parameters may also include the frequency at which the monitored remaining life of filters 40, 42 is updated (e.g., four hours).

In a step 304, fuel filter monitoring module 240 of ECM 80 may determine a remaining life of filters 40, 42. This may be performed with use of physics-based model 242, inputs 210, and fuel commands 230, as well as by values provided to, or calculated with, fuel filter monitoring module 240, such as fuel supply system characteristics 252 and fuel characteristics 254. In particular, step 304 may include determining or adjusting a remaining useful life of filters 40, 42 based on one or more of a change in altitude or other change in location of system 10, a change in fuel temperature, and/or a change in fuel quality. Due to the use of a physics-based model, step 304 may include determining a change in remaining life of filters 40, 42, even when a temperature associated with an internal combustion engine and a pressure drop across the fuel filters 40, 42 remain constant. Step 304 may result in the determination of a remaining life for each individual filter 40, 42 of a plurality of filters of fuel supply system 50. In some aspects, it may be beneficial to monitor each filter 40, 42 individually while also monitoring a remaining life of a group (e.g., subset), or all, of these filters 40, 42.

Step 306 may include determining a remaining life of system 50, such as an estimated amount of time engine 14 may operate before it is advisable or necessary to replace fuel filters 40, 42. Step 306 may include determining a remaining life of system 50 by comparing the remaining life of individual ones of fuel filters 40, 42. For example, first fuel filter 40 may have been determined to have a first remaining life in step 304, while second fuel filter 42 may have been determined to have a different, second remaining life, in this step. Step 306 may include determining which fuel filter has the lowest amount of remaining life. The life of system 50, as a whole, may be set to a value equivalent to this, lowest, remaining life. If desired, step 306 may be performed based at least in part on the rate at which remaining life in fuel filters 40, 42 degrades. For example, fuel filter monitoring module 240 may estimate which fuel filter is expected to deplete its remaining life first, even when this fuel filter currently has a higher amount of remaining life as compared to other fuel filters.

Step 308 may include determining whether one or more fuel filters 40, 42 has been replaced. This may be performed in an automated process performed with module 240, or based on a filter replacement signal received from service device 260. This signal may be generated by a technician following replacement of one or more of the fuel filters 40, 42 in system 10. When step 308 is performed in an automated manner, after replacement of one or more fuel filters 40, 42, monitoring module 240 may determine, model 242 may generate an output that indicates that a remaining life of one or more of these filters has increased. This increase in remaining life may exceed a predetermined threshold and/or be approximately equivalent to a remaining life of approximately 100% in order to trigger this determination. It may also be desirable to determine a filter has been replaced when the remaining life has increased for a predetermined minimum amount of time. However, ECM 80 may be configured to detect replacement of fuel filters 40, 42 within approximately one hour of engine running time following this change. Step 308 may also include determining when one or more, but not all, of fuel filters 40, 42 have been replaced.

When ECM 80 determines, in step 308, that none of fuel filters 40, 42 have been replaced, a step 310 may be performed. Step 310 may include generating an output such as one or more of outputs 270 (FIG. 2). Step 310 may include, for example, generating a filter notification 272 indicative of a remaining life of fuel filters 40, 42. Notification 272 may indicate a remaining life of filters at a percentage (e.g., a value that gradually decreases from 100%), an estimated amount of operating time (e.g., a number of hours before useful life of filters 40, 42 is exhausted and fuel filters 40, 42 should be replaced). In some aspects, notification 272 may be updated at predetermined intervals (e.g., one hour, four hours, 24 hours, etc.), according to the parameters received in step 302. If desired, notification 272 may be generated only when a predetermined amount of life remains (e.g., 25%, 15%, or 0%). Step 310 may also include generating a derate signal 276 to limit the output of engine 14, as described above. Derate signal 276 may be performed when a predetermined amount of life remains in any one of fuel filters 40, 42, such as 0%.

When ECM 80 determines, in step 308, that one or more fuel filters 40, 42 have been replaced, step 312 may be performed to update the initial settings and/or fuel filter life parameters that were received in step 302. These settings and parameters may include fuel quality or other fuel characteristics 254, an initial remaining useful life value of fuel filters 40, 42 and system 50, or others. Additionally, step 314 may be performed to generate an output that is displayed, for example, on a screen of notification device 90. This output may be based on the filter life parameters updated in step 312. For example, step 314 may include generating a notification 272 that indicates that one or more fuel filters 40, 42 have been replaced. Notification 272 may prompt a user to replace an entirety of fuel filters 40, 42, if ECM 80 determines that a subset of the fuel filters 40, 42 were replaced in step 308.

Steps 312 and 314 may also include determining a total operation time of fuel filters 40, 42, and a fuel quality observed during this operation time and generating a suitable notification. For example, if fuel quality, such as fuel cleanliness, indicates that fuel supplied to system 50 during the operation of the replaced filters is dirtier than a predetermined threshold (e.g., a threshold based on an ISO index), ECM 80 may generating a notification 274 indicative of dirty fuel. For example, notification 274 may indicate a need to pre-filter fuel supplied to fuel source 32. If desired, step 314 may include comparing fuel quality to a previously calculated fuel quality for a previously-installed filter. Step 314 may also include generating derate signal 276. This may be desirable, for example, when only a subset of fuel filters 40, 42 are determined to have been replaced, and one or more remaining fuel filters 40, 42 have a remaining life that is lower than the above-described predetermined threshold.

Figure 4:
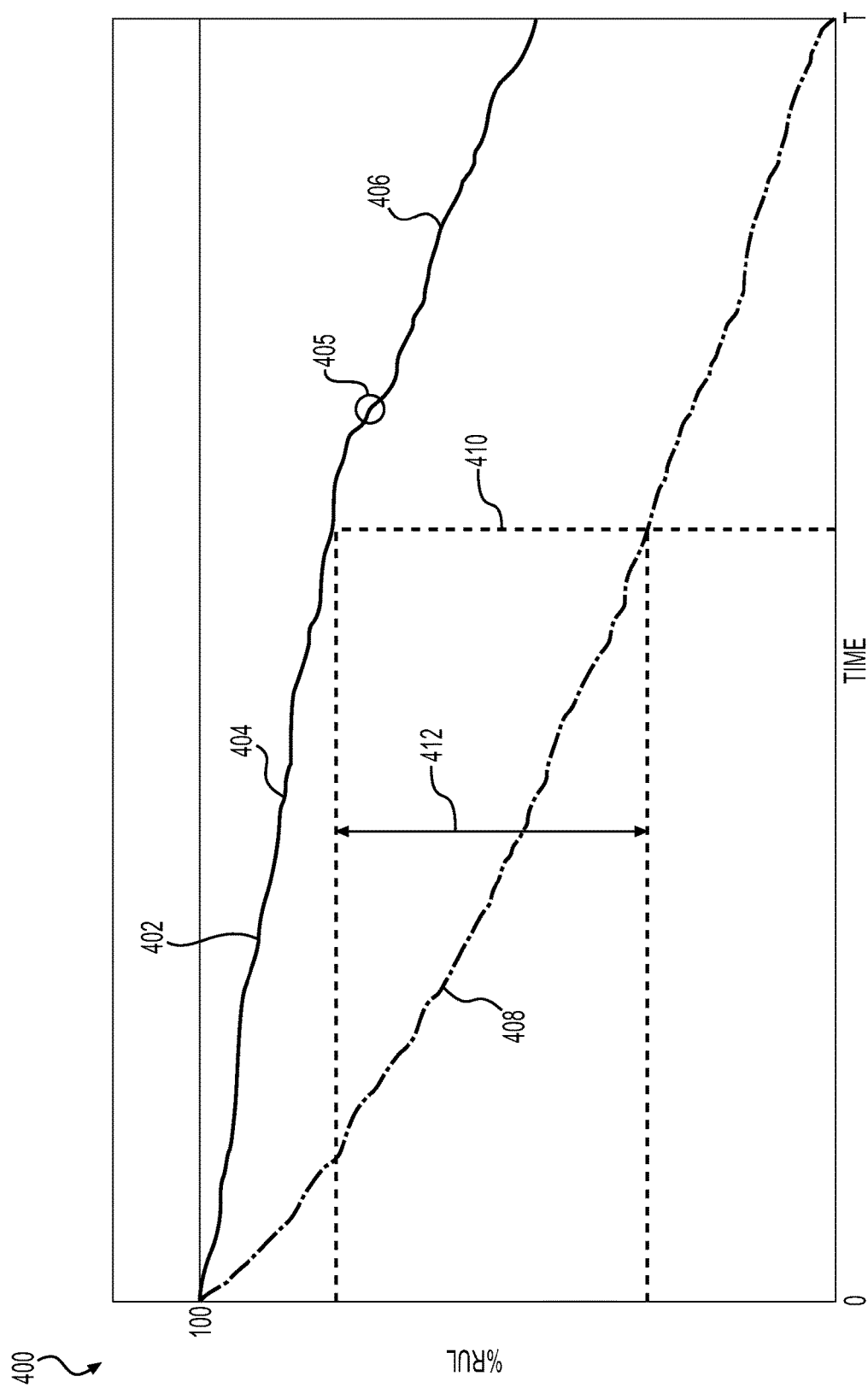
FIG. 4 is a chart illustrating remaining life calculations for presenting notifications or identifying a characteristic of a fuel filter.

FIG. 4 illustrates a pair of exemplary plots 400 of remaining useful life of an exemplary fuel filter. A first plot 402 may correspond remaining useful life of a currently-installed fuel filter 40, 42 having an expected or acceptable performance. First plot 402 may be indicative of a series of remaining useful life values output by model 242 over time during the operation of engine 14. A second, or reference, plot 408 may correspond to a reference fuel filter performance, generated by ECM 80 with model 242. For example, ECM 80 may generate and store reference plot 408 based on performance of a fuel filter 40, 42 that was initially installed in engine 14 (e.g., a fuel filter 40, 42 installed during the manufacture of system 10 and engine 14). Plots 402 and 408 may correspond to moving averages (e.g., over one hour, two hours, four hours, etc.) to reduce the effect of brief fluctuations in remaining life. While FIG. 4 illustrates a single exemplary plot 402 and exemplary reference plot 408, each individual fuel filter 40, 42 may be monitored in this manner, and compared to a different respective reference.

ECM 80 may be configured to compare the current performance of each fuel filter 40, 42 to a reference, such as reference plot 408, at one or more predetermined times. For example, when a predetermined number of operating hours has been reached (e.g., at time 410), ECM 80 may determine a difference 412 between a current remaining life of an installed filter and a predetermined reference amount of remaining life, corresponding to plot 408. When, as shown in FIG. 4, the value of remaining life of a currently installed fuel filter exceeds a corresponding reference remaining life value, ECM 80 may determine that performance of the installed filter 40, 42 is acceptable.

When a current remaining life is determined to be below reference plot 408 by a predetermined amount, such as a first corresponding reference value (e.g., current remaining life is below a corresponding reference value by a first amount), ECM 80 may generate a filter notification 272 notifying an operator that the fuel filter 40, 42 may be performing below an expected performance. When ECM 80 determines that the current remaining life is less than a second reference value (e.g., current remaining life is below a reference value by a second amount representative of unsatisfactory performance of an installed filter), ECM 80 may generate a filter notification 272 indicating that fuel filter performance is low or unacceptable. If desired, notification 272 may also indicate an identity of an installed filter 40, 42, based on this performance. For example, this notification may indicate that the installed filter 40, 42 has been identified as an improper, counterfeit, or damaged fuel filter.

Plot 402 also illustrates a shift in remaining life of a fuel filter 40, 42, as monitored by module 240 of ECM 80, during a change in condition. In the example illustrated in FIG. 4, a shift 405 is associated with an increase in a rate at which remaining life decreases from a first rate 404 to a faster rate 406. This shift 405 may be caused by one or more of a change in altitude (e.g., by relocating engine 14) or other change in location of system 10, a change in fuel temperature, and/or a change in fuel quality.

In some engine systems, it may be desirable to monitor remaining life of one or more fuel filters of a filter assembly. Sensors, such as altitude, atmospheric pressure, fuel pressure, fuel temperature, and others, may be used with a control module that includes a model for determining remaining useful life of the filter assembly and/or of the individual fuel filters. The model may incorporate physics-based formulas, and may provide the ability to guide filter changes. The remaining life of one or more filters may be compared to reference data, used to calculate a decay rate, and reset when the system detects the installation of a new filter, providing guidance to a user. Additionally, the system may be able to adjust for changing conditions including engine operation, fuel cleanliness, or location of the system.

It will be apparent to those skilled in the art that various modifications and variations can be made to the disclosed method and system without departing from the scope of the disclosure. Other embodiments of the method and system will be apparent to those skilled in the art from consideration of the specification and practice of the apparatus and system disclosed herein. It is intended that the specification and examples be considered as exemplary only, with a true scope of the disclosure being indicated by the following claims and their equivalents.

What is claimed is:

1. A fuel filter monitoring system, comprising:
    a sensor system including:
        at least one pressure sensor configured to output a pressure signal that indicates a pressure associated with at least one fuel filter for an internal combustion engine that receives fuel injected by a plurality of fuel injectors; and
        a location sensor configured to output a location signal that indicates a geographic location; and
    a controller configured to:
        receive the pressure signal from the at least one pressure sensor,
        receive the location signal from the location sensor,
        estimate a remaining useful life based on the pressure signal and based on the location signal,
        detect a change in location based on the location signal, and
        change a rate at which the estimated remaining useful life declines based on the change in the geographic location.

2. The fuel filter monitoring system of claim 1, wherein the location sensor includes a positioning system antenna for determining the geographic location.

3. The fuel filter monitoring system of claim 1, further comprising an altitude sensor separate from the location sensor.

4. The fuel filter monitoring system of claim 1, wherein the controller is further configured to estimate the remaining useful life with the use of a model programmed with characteristics of the at least one fuel filter.

5. The fuel filter monitoring system of claim 1, wherein the controller is further configured to output a notification based on a comparison of the estimated remaining useful life with a reference remaining useful life.

6. The fuel filter monitoring system of claim 1, wherein the controller is further configured to estimate the remaining useful life based on fuel provided to the at least one fuel filter.

7. The fuel filter monitoring system of claim 1, wherein the controller is further configured to output a notification based on a comparison of the estimated remaining useful life with a reference remaining useful life, the reference remaining useful life being associated with a performance of a reference fuel filter.

8. A fuel filter monitoring method, the method comprising:
    receiving a pressure signal associated with at least one fuel filter of a fuel supply system for an internal combustion engine;
    receiving a location signal indicative of a geographic location of the internal combustion engine, the location signal being generated by a location sensor;
    estimating a remaining life of at least one fuel filter of the fuel supply system based on the pressure signal and the location signal;
    updating the remaining life of the at least one fuel filter based on the pressure signal and a change in location indicated by the location signal; and
    outputting a notification indicative of a need to replace the at least one fuel filter according to the updated estimated remaining life.

9. The fuel filter monitoring method of claim 8, further comprising modifying a rate at which the estimated remaining life declines based on the change in location indicated by the location signal.

10. The fuel filter monitoring method of claim 8, wherein the geographic location is identified with a global positioning system antenna.

11. The fuel filter monitoring method of claim 8, further comprising detecting a replacement of the at least one fuel filter and generating an output in response to detecting the replacement of the at least one fuel filter.

12. The fuel filter monitoring method of claim 11, further comprising receiving an ambient pressure signal from a barometric pressure sensor separate from the location sensor.

13. A fuel filter monitoring method, the method comprising:
- receiving a pressure signal associated with at least one fuel filter of a fuel supply system connected to an internal combustion engine;
- receiving an engine speed signal indicative of an engine speed of the internal combustion engine;
- calculating an estimated remaining life of the at least one fuel filter of the fuel supply system based on the pressure signal and based on the engine speed signal; and
- outputting a notification indicative of a condition of the fuel supply system, the notification being based on a comparison between the estimated remaining life to a reference remaining life.

14. The fuel filter monitoring method of claim 13, wherein the notification indicates a performance of the at least one fuel filter.

15. The fuel filter monitoring method of claim 13, wherein the notification indicates a performance of the at least one fuel filter of the fuel supply system.

16. The fuel filter monitoring method of claim 15, further including determining an identity of the at least one fuel filter based on the performance of the at least one fuel filter.

17. The fuel filter monitoring method of claim 13, wherein the reference remaining life is associated with a performance of a reference fuel filter.

18. The fuel filter monitoring method of claim 17, wherein the reference fuel filter was installed for the internal combustion engine.

19. The fuel filter monitoring method of claim 13, wherein the notification indicates that the condition of the fuel supply system is a presence of an improper, counterfeit, or damaged fuel filter.

20. The fuel filter monitoring method of claim 13, wherein the estimated remaining life of the at least one fuel filter is calculated with use of a physics-based model.

* * * * *